United States Patent [19]

Tadokoro et al.

[11] 4,356,232

[45] Oct. 26, 1982

[54] METHOD FOR PRODUCING MAGNETIC RECORDING MEDIUM

[75] Inventors: Eiichi Tadokoro; Haruo Masuda; Nobutaka Yamaguchi; Masaaki Fujiyama, all of Odawara, Japan

[73] Assignee: Fuji Photo Film Co., Ltd., Kanagawa, Japan

[21] Appl. No.: 252,746

[22] Filed: Apr. 10, 1981

[30] Foreign Application Priority Data

Apr. 10, 1980 [JP] Japan .................................. 55-47178

[51] Int. Cl.³ ................................................ G11B 5/70
[52] U.S. Cl. ................................ 428/325; 252/62.54; 360/134; 427/128; 427/132; 428/329; 428/331; 428/694; 428/900
[58] Field of Search ............... 428/325, 694, 695, 692, 428/900, 313.3, 328, 313.7, 329, 313.9, 331, 441, 442; 427/128, 132, 127, 199; 252/62.53, 62.54; 360/134, 135, 136

[56] References Cited

U.S. PATENT DOCUMENTS

| Re. 28,866 | 6/1976 | Huefele et al. ................... 252/62.54 |
| 3,687,725 | 8/1972 | Hartmann et al. .................. 428/325 |
| 3,955,295 | 5/1976 | Mayer ................................. 428/325 |
| 4,015,042 | 3/1977 | Chussaigne ......................... 428/900 |
| 4,074,002 | 2/1978 | Hack et al. .......................... 428/694 |
| 4,275,115 | 6/1981 | Naruse ............................. 252/62.54 |
| 4,285,825 | 8/1981 | Isobe et al. ......................... 428/900 |

*Primary Examiner*—Stanley S. Silverman
*Attorney, Agent, or Firm*—Sughrue, Mion, Zinn, Macpeak & Seas

[57] ABSTRACT

A method for producing a magnetic recording medium which comprises preparing a dispersion containing a ferromagnetic powder and a binder in the presence of non-alkali beads and coating the resulting dispersion on a non-magnetic support, and a magnetic recording medium obtained by the above method.

6 Claims, No Drawings

METHOD FOR PRODUCING MAGNETIC RECORDING MEDIUM

FIELD OF THE INVENTION

This invention relates to a magnetic recording medium. More particularly, this invention relates to a magnetic recording medium containing non-alkali beads in the magnetic layer thereof to minimize the head abrasiveness of magnetic recording apparatus and a method for producing a magnetic recording medium.

BACKGROUND OF THE INVENTION

Hitherto, various methods for controlling the head abrasiveness of magnetic recording apparatus have been proposed. Typical examples of such methods include a method comprising incorporating an abrasive into the magnetic layer of magnetic recording medium as disclosed in U.S. Pat. Nos. 3,007,807, 3,041,196 and 3,293,066; a method for improving the surface of magnetic layer as disclosed in U.S. Pat. Nos. 2,688,567, 2,998,325 and 3,783,023; a method for reducing the coefficient of friction as disclosed in U.S. Pat. Nos. 2,654,681, 3,470,021 and 3,492,235, etc.

However, these conventional methods are still unsatisfactory since they are liable to be affected by temperature changes and moisture conditions and also exhibit somewhat poor contact with tape transportation systems and, therefore, further improvements of such magnetic recording medium have been desired.

SUMMARY OF THE INVENTION

A primary object of the present invention is to provide a magnetic recording medium having an improved low head abrasiveness.

Another object of the present invention is to provide a magnetic recording medium having a low head abrasiveness which is not influenced by temperature changes and moisture conditions.

A further object of the present invention is to provide a method for producing a megnetic recording medium having the above-described improved properties.

DETAILED DESCRIPTION OF THE INVENTION

The above objects of the present invention can be achieved by incorporating non-alkali beads into the magnetic recording layer of the magnetic recording medium comprising a non-magnetic support and a magnetic recording layer provided on the support.

The above objects of the present invention can also be achieved by a method for producing a megnetic recording medium which comprises preparing a dispersion containing ferromagnetic powder and a binder in the presence of non-alkali beads and coating the dispersion on a non--magnetic support.

The term "non-alkali beads" as used herein means glass beads which are substantially free from alkali metal elements such as lithium, sodium and potassium as glass components (the content of alkali metal elements at a level not more than 0.1% by weight based on the total weight of glass beads is acceptable). More specifically, the non-alkali beads means glass beads composed of at least one of $SiO_2$, $Al_2O_3$, $MgO$, $CaO$, $TiO_2$, $ZrO_2$, etc. The compositions of such non-alkali glass beads are disclosed, for example, in Japanese Patent Publication No. 38851/77, Japanese Patent Application OPI No. 102325/78, etc. (The term "OPI" as used herein refers to a "published unexamined patent application".)

The particle size of non-alkali beads used in the present invention differs depending upon the utility of the magnetic recording medium, but can be any size so long as they have a diameter less than about 10 mm in dispersing with a ferromagnetic powder. The non-alkali beads are pulverized into fine powder during the dispersion operation and are finally in the particle size less than about $20\mu$ in the magnetic layer coated on the support. Generally, the non-alkali beads can be used in a proportion less than about 0.1 wt % based on the amount of the ferromagnetic powder in the magnetic layer.

The non-alkali glass beads can be incorporated in preparing a magnetic coating solution, in particular, in dispersing a ferromagnetic powder using a sand grinder, ball mill and the like. The magnetic coating solution and the preparation thereof as well as the production steps thereof are disclosed in detail in U.S. Pat. No. 4,135,016.

The magnetic recording medium according to the present invention makes it possible to minimize the head abrasiveness of magnetic recording apparatus and such effects are not adversely influenced by temperature changes and moisture conditions.

The present invention is further illustrated in greater detail by the following Examples. Unless otherwise indicated, all parts, percents and ratios and the like are by weight.

EXAMPLE 1

The composition A described below was charged into a 2-liter sand grinder and then 900 g of Glass Beads A or B was added thereto, followed by dispersing the mixture for 6 hours. To the resulting dispersion A was added 4.8 g of 75 wt% solution of a polyisocyanate (a reaction product of 3 mols of a 2,4-tolylenediisocyanate compound and 1 mol of trimethylolpropane) in ethyl acetate to prepare Coating Solution A. Then, Coating Solution A was coated on a polyethylene terephthalate film having a thickness of $14.5\mu$ in a coating thickness of $4.5\mu$ (on dry basis) and dried, and the resulting magnetic recording medium was subjected to calendering (temperature of metal roll surface, 100° C.; calender speed, 100 m/min.; nip pressure, 450 kg/cm; number of nips, 3; number of repeating, 6) to obtain Magnetic Recording Medium A.

| Composition A | |
|---|---|
| Fe—Co—Ni Alloy Metal Powder (Weight ratio of Fe:Co:Ni = 7:2.97:0.03. Necklace type structure (6 to 12 particles having a size of 200A are linked in a chain. Coercivity: 720 Oe) | 300 g |
| Vinyl Chloride-Vinyl Acetate Copolymer (Ratio of vinyl chloride-vinyl acetate = 87:13. Degree of Plymerization, 350) | 36 g |
| Polyester Polyol (Reaction product of 1 mol of adipic acid, 1 mol of diethylene glycol and 0.06 mol of trimethylolpropane; Viscosity, 1000 cp (at 75° C.); Specific Gravity, 1.18; OH Value 60; Acid Value, less than 2) | |
| Soybean Lecithin | 1.2 g |
| Silicone Oil (dimethyl polysiloxane) | 0.6 g |
| Methyl Ethyl Ketone | 600 g |
| Toluene | 700 g |
| Composition of Glass Bead A | |
| $SiO_2$ | 71.02% |
| $Al_2O_3$ | 2.33% |

| -continued | |
|---|---|
| CaO | 9.60% |
| MgO | 2.83% |
| Na$_2$O | 13.09% |
| K$_2$O | 0.63% |
| Others | 0.50% |
| Average Particle Size | 2.5 mm |
| Composition of Glass Bead B | |
| SiO$_2$ | 37% |
| Al$_2$O$_3$ | 13% |
| MgO | 10% |
| CaO | 15% |
| TiO$_2$ | 24% |
| ZrO$_2$ | 1% |
| Average Particle Size | 2.5 mm |

TABLE

| Samples | Composition | Glass Beads Composition | Head Abrasiveness ($\mu$/100 hrs.) | | | | | | | |
|---|---|---|---|---|---|---|---|---|---|---|
| | | | −5° C. Dry | 5° C. 30%* | 5° C. 85% | 20° C. 30% | 20° C. 60% | 20° C. 85% | 40° C. 30% | 40° C. 85% |
| Example 1 | | | | | | | | | | |
| Comparative Example | A | A | 6.0 | 6.0 | 8.0 | 1.0 | 1.5 | 4.0 | 3.5 | 6.0 |
| Present Invention | A | B | 1.0 | 1.0 | 1.2 | 1.0 | 1.2 | 1.8 | 1.8 | 2.0 |
| Example 2 | | | | | | | | | | |
| Comparative Example | B | A | 3.0 | 3.0 | 10.0 | 1.0 | 2.0 | 9.0 | 6.0 | 10.0 |
| Present Invention | B | B | 0.8 | 1.0 | 1.8 | 0.8 | 1.0 | 1.6 | 1.6 | 2.0 |

*Relative Humidity

The above-obtained Magnetic Recording Medium A was slit into ½ inch tapes (for 2 hour-recording tapes) and mounted on VHS (Video Home System) type video recorder. Th tape was run in 50 passes (the total running time: 100 hours) and the head abrasiveness was determined before and after the tape running. The results obtained are shown in Table 1 below.

EXAMPLE 2

The procedure as described in Example 1 was followed except that Composition B was used instead of Composition A and the 75% polyisocyanate solution was used in an amount of 7.6 g instead of 4.8 g. The results obtained are shown in Table below.

| Composition B | |
|---|---|
| Co—FeOx | 300 g |
| (4/3 ≦ X < 3/2; Size: length, 0.3$\mu$; width, 0.02$\mu$; Coercivity: 660 Oe) | |
| Nitrocellulose | 28 g |
| (Nitrogen content, 11.2–12.3%; Degree of polymerization, 550) | |
| Epoxy Resin | 10 g |
| (Reaction product of Bisphenol A and epichloro hydrin; Molecular weight, 900; Epoxy equivalent, 460–520; Hydroxy group content, 0.29%) | |
| Silicone Oil (dimethyl polysiloxane) | 0.3 g |
| Soybean Lecithin | 1.2 g |
| Aluminum Oxide (Alumina) | 6 g |
| (Average particle size; 4$\mu$) | |
| Carbon Black | 20 g |
| (Average particle size; 0.02$\mu$) | |
| Butyl Acetate | 1300 g |

As is apparent from the results shown in Table below, the magnetic recording medium containing non-alkali beads in the magnetic layer exhibit a markedly low head abrasiveness as compared with the magnetic recording medium containing alkali beads in the magnetic layer. This tendency is remarkable when the relative humidity increases and then the binder used is a vinyl chloride-vinyl acetate copolymer as compared with nitrocellulose.

While the invention has been described in detail and with reference to specific embodiments thereof, it will be apparent to one skilled in the art that various changes and modifications can be made therein without departing from the spirit and the scope thereof.

What is claimed is:

1. A method for producing a magnetic recording medium which comprises preparing a dispersion containing a ferromagnetic powder and a binder in the presence of non-alkali glass beads containing alkali metal elements at a level not more than 0.1% by weight, wherein said glass beads are present in an amount less than about 0.1 weight % based on the amount of the ferromagnetic powder and coating the resulting dispersion on a non-magnetic support.

2. The method of claim 1, wherein said glass beads are composed of one or more of SiO$_2$, Al$_2$O$_3$, MgO, CaO, TiO$_2$ and ZrO$_2$.

3. The method of claim 1 or 2, wherein said glass beads are of a particle size less than about 20 microns.

4. A magnetic recording medium comprising a non-magnetic support having coated thereon a magnetic recording layer comprising a ferromagnetic powder, a binder and non-alkali glass beads containing alkali elements at a level not more than 0.1% by weight wherein said beads are present in an amount less than about 0.1 weight % based on the amount said ferromagnetic powder.

5. The recording medium of claim 4, wherein said glass beads are composed of one or more of SiO$_2$, Al$_2$O$_3$, MgO, CaO, TiO$_2$ and ZrO$_2$.

6. The recording medium of claim 4 or 5, wherein said glass beads are of a particle size less than about 20 microns.

* * * * *